July 13, 1926.

W. SCHMID 1,592,287

GEAR WHEEL BEARING FOR FISHING REELS

Filed July 23, 1925

Inventor
William Schmid,

By

Attorneys

Patented July 13, 1926.

1,592,287

UNITED STATES PATENT OFFICE.

WILLIAM SCHMID, OF COLDWATER, MICHIGAN.

GEAR-WHEEL BEARING FOR FISHING REELS.

Application filed July 23, 1925. Serial No. 45,571.

My Patent No. 1,461,586 granted July 10, 1923, on a level wind fishing reel is a good example for a gear wheel solely supported from a gear housing adapted to impart rotation to reel parts, for instance a spool or a level wind mechanism. The gear wheel is disclosed as supported on the head of a spindle journaled in a bearing protruding from the gear housing, and a crank mounted on the spindle is adapted for imparting rotation thereto. In good reel construction it is desirable that the single or double crank be located as close as possible to the gear housing or head of a reel, consequently a short bearing is used, but such bearing is not of sufficient length to afford a good bearing for the spindle. Then again, when the gear wheel is solely supported by the spindle there is considerable wear on the spindle and short bearing, so to provide a better gear bearing, I have devised a bearing which is carried by the gear housing or end of the reel and extends into the gear wheel so that the gear wheel may revolve about the bearing.

My invention further aims to provide a long bearing for a gear wheel spindle and to articulate the gear wheel and a single or double crank so that they rotate in unison without the rotation having any effect on the means employed for tying the gear wheel to the crank. This avoids parts from becoming loose, unnecessarily worn or lost.

My invention still further aims to provide a compact, simple and inexpensive spool driving mechanism for a fishing reel and this mechanism will be hereinafter specifically described and then claimed.

Reference will now be had to the drawing wherein

Figure 1:
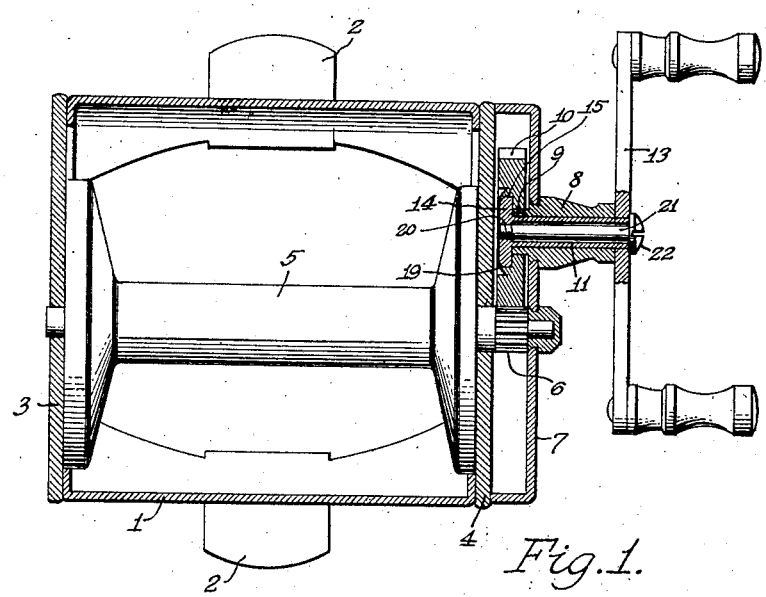
Figure 1 is a longitudinal sectional view of a reel provided with a gear bearing in accordance with this invention.
Figure 2:
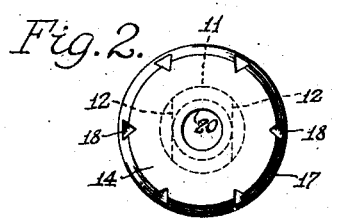
Fig. 2 is an end view of a spindle head.

In the drawing, the reference numeral 1 denotes a reel frame having reel seat members 2 and at the ends of said reel frame are heads 3 and 4 supporting a rotatable spool 5. The spool 5 has a small gear wheel 6 in the housing 7 suitably attached to the head 4 and said housing is adapted to support a spool driving mechanism.

8 denotes a bearing protruding outwardly from the gear housing 7, said bearing being fixed to the wall of said housing and formed with an inwardly projecting end or sleeve portion 9 on which rotates a large gear wheel 10 meshing with the small spool gear wheel 6.

11 denotes a tubular spindle journaled in the bearing 8, said spindle having its outer end protruding from the bearing 8 and provided with facets 12 for establishing a driving relation with a single or double crank 13.

Figure 3:
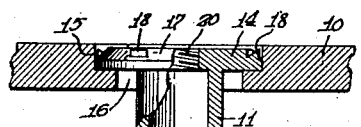
Fig. 3 is a longitudinal sectional view of the same placed in a gear body preparatory to being anchored therein.
Figure 5:
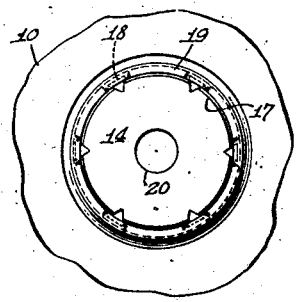
Fig. 5 is an end view of the same.
Figure 4:
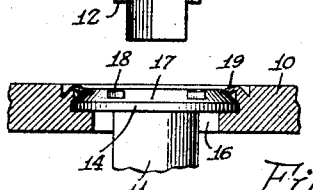
Fig. 4 is a similar view showing the spindle head anchored or fixed in the gear wheel.

14 denotes a head integral with the inner end of the spindle 11 and said head is seated in the enlarged end 15 of the opening or recess 16 which receives the inner end or sleeve portion 9 of the bearing 8. This is best shown in Figs. 3 and 4. The head 14 is preferably formed with a beveled peripheral edge 17 having a plurality of lugs 18. The gear wheel 10 is preferably made of brass and the material forming the side wall at the enlarged end of the opening 16 is rolled over or peened to form an annular flange 19 for engaging the beveled edge 17 of the head 14. The flange 19 is formed over the lugs 18 and consequently the gear wheel 10 is anchored or fixed to the head 14 to establish a driving relation between the gear wheel and the spindle 11.

The head 14 of the spindle 11 has a concentric opening 20 with its walls screwthreaded, as best shown in Fig. 3, to receive the screwthreaded end of a tie screw 21 extending through the spindle 11, said screw having a head 22 retaining the crank 13 on the end of the spindle. The screw 21 and the spindle 11 cooperate with the head 14 in providing means, longitudinally of the bearing 8, for holding the gear wheel 10 and the crank 13 relative to said bearing.

As a result of the above construction a substantial gear bearing is attained wherein the gear and its operating mechanism is solely supported by the gear housing or reel end member and bodily removable therewith, which is desirable for reel cleaning purposes. There are various types of reels in which my long bearing may be advantageously used, and for this reason I do not care to confine my invention to any particular reel construction other than defined by the appended claims.

What I claim is:

1. A fishing reel having a head with a gear wheel therein adapted to impart rotation to one or more reel parts, a bearing projecting from both sides of said head and supporting said gear wheel on its inner end, said gear wheel having an opening in its side to receive an end of said bearing, said wheel opening having an enlarged end, and a spindle journaled in said bearing for rotating said gear wheel, said spindle having its inner end anchored in the enlarged end of said gear wheel opening.

2. A fishing reel as claimed in claim 1, and a head on said spindle fixed in the enlarged end of said gear wheel opening by peened over portions of said gear wheel.

3. In a fishing reel wherein a gear wheel is adapted to impart rotation to one or more reel parts, and wherein said gear wheel is enclosed by a housing;—a bearing carried by said housing and supporting said gear wheel, a tubular spindle extending through said bearing for imparting rotation to said gear wheel, and a head on the inner end of said spindle provided with an opening to facilitate attaching a crank to said spindle.

4. In a fishing reel wherein a gear wheel is adapted to impart rotation to one or more reel parts, and wherein said gear wheel is enclosed by a housing;—a bearing carried by said housing and supporting said gear wheel, by extending into one side of said gear wheel, and a tubular driving spindle journaled in said bearing, a head on said spindle at the end of said bearing, lugs on said head, and a flange on said gear wheel adapted to be peened over the lugs of said head.

5. In a fishing reel having a head containing mechanism adapted to impart rotation to reel parts, and a crank outside of said head adapted for operating said mechanism;—a tubular spindle supporting said crank and extending into said reel head for operating the mechanism therein, and means longitudinally of said spindle and anchored in said head for holding said crank on said spindle.

6. A fishing reel as called for in claim 5, wherein said tubular spindle has an inner head fixed to a part of said mechanism and said means includes a tie screw extending through said spindle into said spindle head.

In testimony whereof I affix my signature.

WILLIAM SCHMID.